Nov. 17, 1970 J. PAUSCH 3,540,193
CLEANING OF DUST SEPARATING APPARATUS
Filed July 12, 1968 3 Sheets-Sheet 2

INVENTOR.
Josef Pausch
BY
Whiteley and Caine
ATTORNEYS

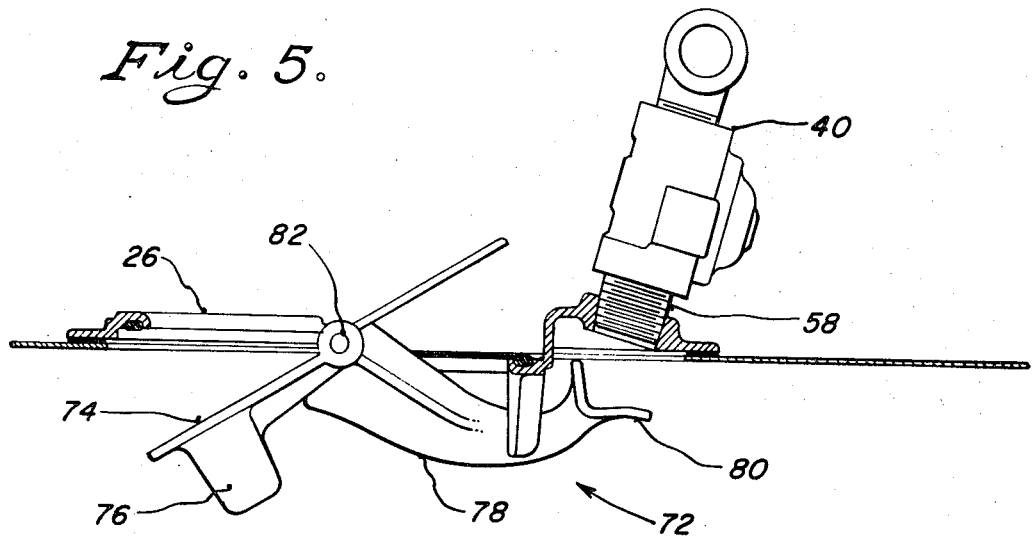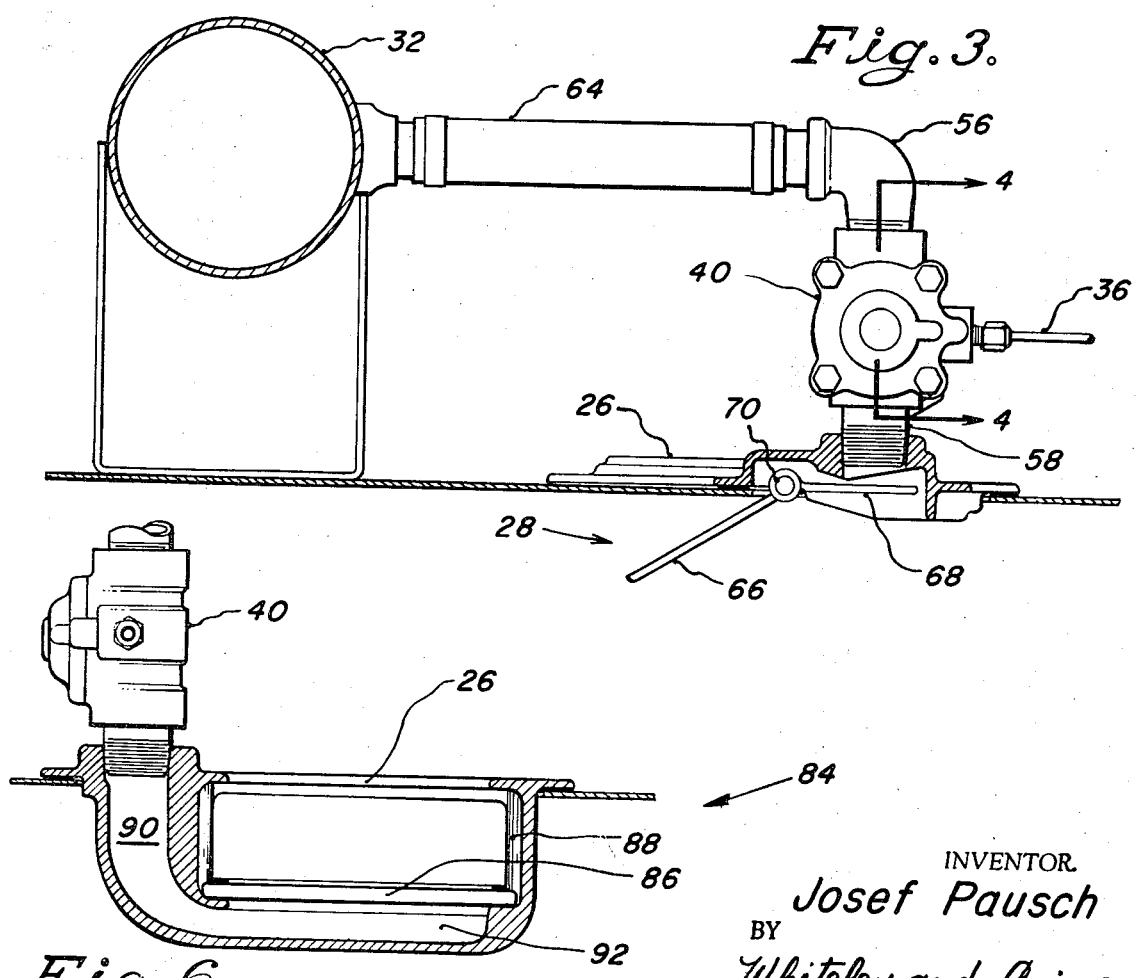

United States Patent Office 3,540,193
Patented Nov. 17, 1970

3,540,193
CLEANING OF DUST SEPARATING APPARATUS
Josef Pausch, Hopkins, Minn., assignor to Aerodyne
Machinery Corporation, Hopkins, Minn.
Filed July 12, 1968, Ser. No. 744,558
Int. Cl. B01d 46/46
U.S. Cl. 55—273
1 Claim

ABSTRACT OF THE DISCLOSURE

A system for dislodging dust from a porous filtering surface, embodying the use of a high pressure gas emitted from a reservoir into a chamber on the clean gas side of the porous filtering surface in such a manner that the gas provides the force and energy to close a valve to seal the chamber and also rapidly raise the pressure in the sealed chamber so as to cause a shock which dislodges the accumulated dust on the opposite side of the filter.

THE INVENTION

This invention relates to improvements in method and apparatus for dislodging accumulated solids from a porous filtering surface.

An object of the invention is to provide a method and means of utilizing a high energy gas for the dual purpose of closing communication between portions of a filtering system so as to build up pressure in a portion of the system on one side of a porous filtering surface to cause discharge of accumulated solids on the opposite side of such surface.

Another object is to provide a filtering system in which valve means that control communication between portions of the clean gas part of the system may be moved to a closed position by a high energy gas which thereafter raises the pressure within that portion of the system to dislodge accumulated solids that have collected on an opposite side of a porous filtering media.

Other and further objects may become apparent from the following specification and claims, and in the appended drawings in which:

FIG. 3 is a side elevation of a portion of the structure shown in FIG. 2;

FIG. 5 is a side elevation of another embodiment of a part of the invention; and FIG. 6 is a sectional view of a further embodiment of the invention.

Referring now to the several figures of the drawings, the invention will be described in detail.

Figure 1:
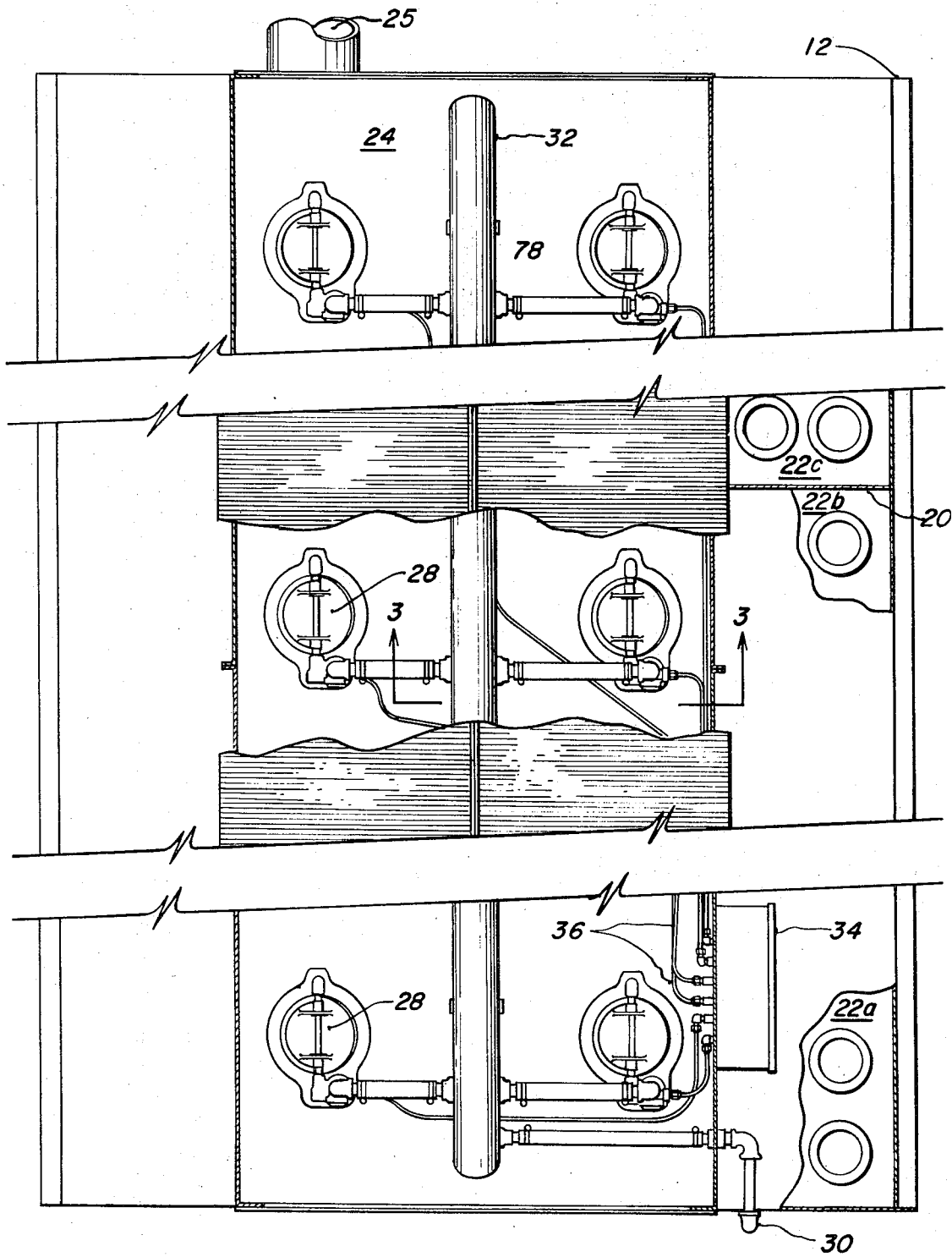
FIG. 1 is a plan view with parts broken away showing a portion of a system for filtering dust or other solids from air or other gases, and which embodies the present invention.

Referring to FIG. 1, general reference numeral 10 indicates in its entirety a system for filtering dust from a dust-air mixture and which would find particular utility in a situation where there might be a relatively high proportion of dust to air, or at least, a situation where there is a relatively large amount of dust that must be collected and separated. The apparatus includes a general casing, indicated by reference character 12, and composed of a lower portion 14 disclosed in FIG. 2, which receives a dust-air mixture. The mixture is admitted to portion 14 through a duct, not shown. Within the interior of portion 14 is a multiplicity of porous filtering elements, designated severally by reference numeral 16, which are each composed of a wire frame around which is a fabric bag or "sock." These elements 16 have their outer surfaces exposed to the dust-laden atmosphere within the interior of casing portion 14, and their interior surfaces in communication with an intermediate clean-air chamber designated at 18. The intermediate chamber 18 is divided by upright partition portions 20 into a series of individual chambers designated as 22a, 22b, and 22c. The general structure 10 may contain a multiplicity of these individual chambers arranged in two rows, but for simplicity of disclosure, one row has been omitted from the left-hand side of the disclosure of FIGS. 1 and 2, since these parts would be a mere duplication of those already shown. Situated above the intermediate chamber 18 is a housing forming a second clean-air chamber, designated by reference character 24. The clear-air chamber 24 is shown with a duct 25 that extends to a fan or blower, not shown, which when operative will draw cleaned air from chamber 24 and discharge the same as desired.

Between each of the several intermediate chambers 22a, 22b, 22c, and the upper clean-air chamber 24, is a large opening designated by reference character 26 that forms a passage for the clean air. Each of these passages, or openings 26 is rendered closable by a large valve member 28. The valve member 28 is mounted in a support which permits movement between a position blocking air flow in the passage and one permitting air flow in the passage.

Figure 2:
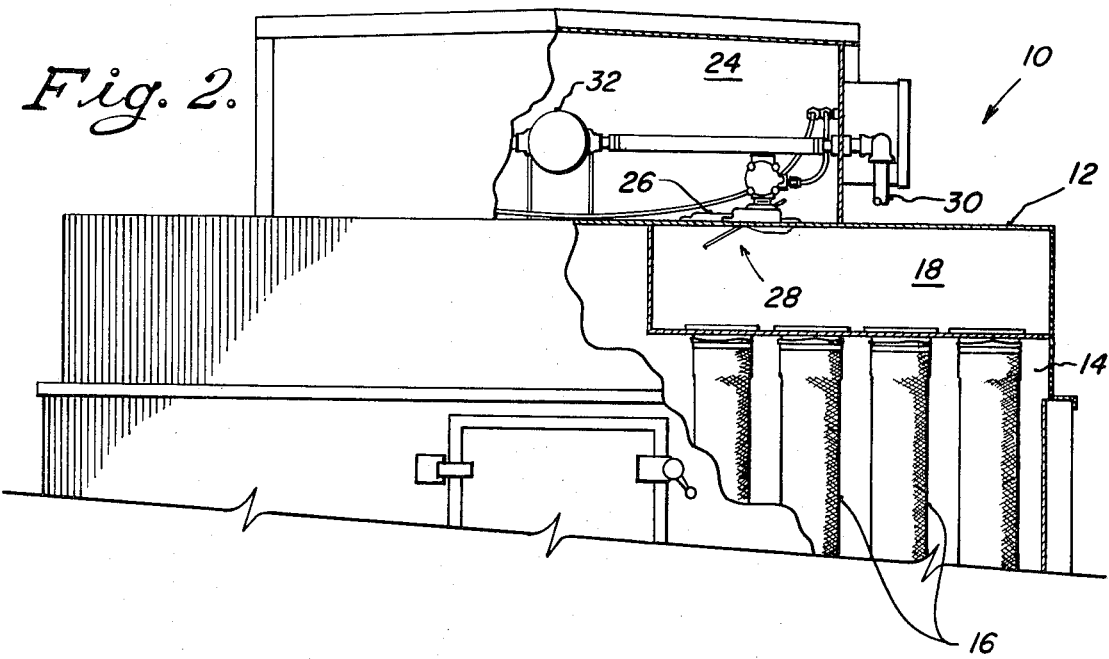
FIG. 2 is a side elevation of a portion of the structure shown in FIG. 1, with parts broken away to show interior structure.

As best seen in FIGS. 1 and 2, a pipe or conduit 30 extends from a source of compressed air, such as a mechanical compressor to a large cylinder 32, which serves as a reservoir of compressed air which is used for dislodging the accumulated dust or other materials from the outer surfaces of the numerous porous filtering elements 16, as will be described hereinafter. The capacity of member 32 must be such that the gas when released to a single chamber, viz. 22a, will charge the space with enough high energy gas as to exceed the capacity of said space and initially establish a pressure therein which exceeds the pressure in space 14.

As seen in FIG. 1, an enclosure 34 constitutes a timer, and has extending thereto a number of small conduits which are collectively designated by the reference character 36, each of which extends from a control input passage 38 on a control device 40. Each of the conduits 36 within the timer mechanism 34 is connected to an individual electrically controlled solenoid valve, not shown, which, when actuated by the timing mechanism, permits escape of high pressure air through a selected conduit 36 to actuate a selected control device 40. In some applications it would be permissable to have the control device 40 operate directly by electricity; however, generally air operated devices are used, thereby confining electrical circuits to the timer enclosure.

The control device 40, shown in FIGS. 3, 4, 5, and 6, is a commercial product for compressed air use, and controls the flow of high pressure air from the large reservoir 32 to each of the several chambers 22a, 22b and 22c, when the timer actuates the appropriate conduit 36.

Figure 4:
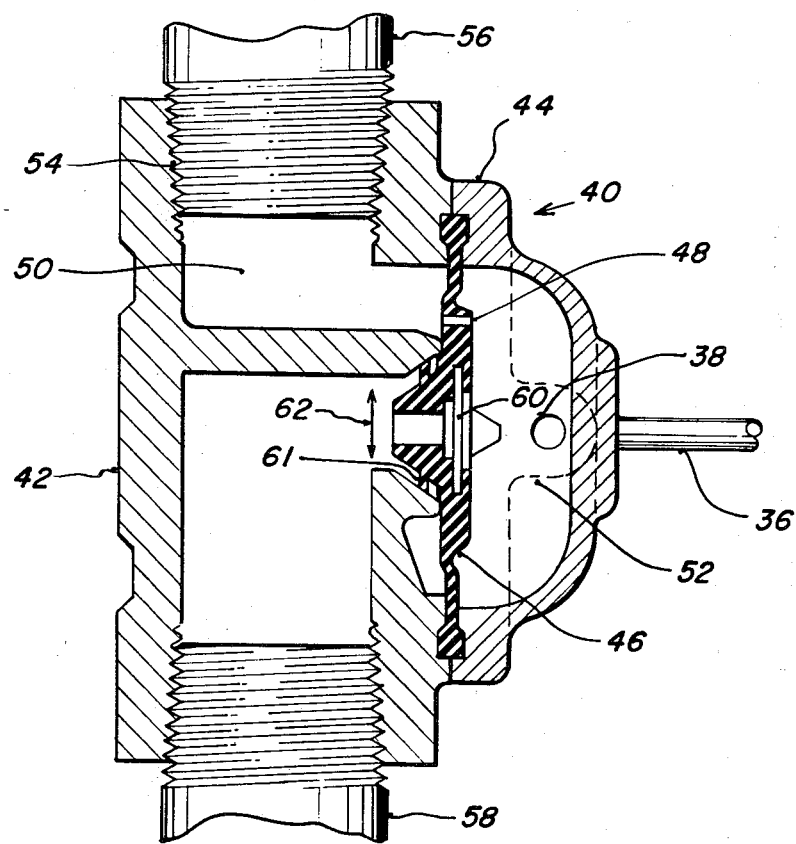
FIG. 4 is a sectional enlargement of a control element shown in FIG. 3.

Referring now to FIG. 4, the control device 40 is composed of a portion 42, and another portion 44, which are separated from each other by a flexible diaphragm 46, which diaphragm contains a small bleed hole or passage 48 in the portion 44 that provides communication between chamber 50 and chamber 52 on the right-hand side of the diaphragm. A threaded opening 54 in the portion 42 is adapted to receive a conduit 56, which extends from the reservoir 32 so that high pressure air may enter the chamber 50. The chamber 50 also has connected thereto a conduit 58, which extends into the clean-air chamber 18. A metallic disc 60 is affixed to and stiffens a portion of a valve seal 61 in a valve passage 62 within chamber 50.

Referring now to FIGS. 3, 5 and 6, the embodiments of the valve mechanism are shown as they would be mounted in the operating air filter, so that the compressed air discharge will operate the valve mechanism. In FIG. 3, the reservoir 32 is connected by a piece of flexible tubing 64 to the control valve 40 through the conduit 56. The flexible tubing 64 absorbs any shock caused by the valve mechanism's operation.

Referring now to FIG. 3, the control valve, generally designated at 28, consists of a metal plate which has a section 66 to cover the passage 26 between the chambers 18 and 24, and a section 68, which is positioned at the discharge outlet 58 from the control valve. The two sections are connected and hinged at the pivotal support 70. The valve rotates on the pivotal support 70 from the position shown in FIG. 3 during the air filtering process to a position at which the section 66 effectively seals the passage 26 during filter cleaning.

Referring now to FIG. 5, a control valve, generally designated at 72, consists of a plate 74 which is adapted to seal the passage opening 26 during filter cleaning. To this plate 74 is attached a counterweight 76, and a blast arm 78, to which, in turn, is attached a deflecting plate 80, positioned at the discharge end of the conduit 58 from the compressed air control valve 40. The counterweight 76 is of sufficient mass to maintain the valve in the normally open position shown, when air filtering is in process. The plate 74 is mounted on pivotal support 82 to effect the opening and closing thereof.

Referring now to FIG. 6, a valve, generally designated at 84, has a plate 86 which is adapted for vertical movement in a guiding structure 88. The discharge from the compressed air control valve 40 follows a duct 90 to a chamber 92 beneath the plate 86. During the air filtering process, the plate 86 seals the chamber 92, and the filtered air passes through openings in the valve guide 88, and through the passage 26. During the filter cleaning process, the plate 86 blocks the passage 26 by riding vertically in the valve guide 88. With the closing of the passage 26, the remainder of the discharge of high energy gas flows into the chamber 18, and within the interior surfaces of the several filter elements 16.

The operation of the invention will now be explained. The structure 10 disclosed in this application may vary considerably in size, but in general, it is used in a location where a considerable amount of dust or other solids are formed and must be separated from a relatively large volume of air. The dust-laden air must be admitted into the lower chamber 14 of the housing 12, and in general, this is accomplished by a means of one or more blowers or fans having their low pressure side associated with the outlet pipe 25 extending from the clean-air chamber 24, so as to draw the dust-laden air into chamber 14, filtering the solids therefrom on the outer surfaces of the multiplicity of porous filter tubes 16, and with the clean air entering the chamber 18 and passing through the several valve openings 26 into the chamber 24, from where it is exhausted. In a typical example of an actual structure, I have provided 12 valves of the types disclosed, and in general, all of these valves will be in an open position so that all of the several separated chambers, of which three are designated as 22a, 22b and 22c, etc., are in full communication with the clean-air chamber 24. The timer mechanism 34 is so adjusted as to actuate each of the several valves 28 in a proper sequence. It is necessary that the reservoir 32 contains its charge of air at maximum pressure, and since this pressure is discharged in an explosive-like manner in each of the several separated chambers in a sequential arrangement, the timing mechanism is so arranged that the reservoir 32 has its supply completely replenished between operations of the various valve members. When the timer mechanism determines that one of the valves is to be closed, the air pressure in chamber 52 of valve 40 is released through conduit 36. Conduit 36 is somewhat larger than the bleeder passage 48. The differential in pressure on opposite sides of the diaphragm, caused by releasing the pressure in chamber 52, causes the diaphragm to be arched into chamber 52, thereby lifting the valve seal 61 from the valve passage 62, so as to permit the high pressure air in reservoir 32 to discharge through conduit 58 into the clean-air chamber 18. When the operation is over, conduit 36 is again blocked at the timer, and bleeder passage 48 restores the pressure in chamber 52, thereby causing the diaphragm 46 to move so as to cause the compressed air flow through the conduit 58 to stop.

Referring now to FIG. 3, when the timing device 34 causes the control valve 40 to release the stored compressed air, such air is discharged onto the section 68 of valve 28. The section 68 is forced to rotate away from the discharge of compressed air as it enters the chamber 18, causing the rotation of section 66 into a position to close passage 26. Thus, the entire discharge of compressed air is forced to and through the filter elements 16, and causes them to be freed of accumulation. The filter cleaning is accomplished in a fraction of a second, and then the compressed air flow is stopped. When there is no longer pressure on the section 68 of valve 28 from the flow of compressed air, the heavier of the two sections, section 66, by force of gravity returns the valve to the open position, and the particular filtering section resumes the filtering process. In turn, each of the other sections 22a, 22b and 22c, etc. goes through a similar process, so that the filtering process is unimpaired during cleaning.

Referring now to FIG. 5, it will be seen that the compressed air charge from the outlet 58 will strike the deflecting plate 80 and the force of the compressed air will be sufficient to cause the valve plate 74 to rotate on the support 82, thereby blocking the passage 26. Again, as the discharge of compressed air is completed, the counterweight 76 is sufficiently heavy to restore the plate 74 to an open position allowing cleaned air to escape, and positioning the deflecting plate 80 for the next filter cleaning cycle.

Referring now to FIG. 6, the control valve 40 discharges compressed air through the duct 90 to a chamber 92 beneath the plate 86. In the normal position, when air filtering is in process, the plate 86 covers chamber 92. However, when the filters are to be cleaned and the compressed air is discharged, the plate 86 is forced upward and away from the chamber opening. The blast of compressed air is sufficient to force the plate 86 upwardly in the valve guide 88 to seal the passage 26 to the chamber 24. The valve guide 88 has openings sufficiently large to pass the compressed air into the chamber 18 to clean the filter tubes 16, when the plate 86 is in the raised position. These same openings allow the cleaned air to exhaust into chamber 24, when the plate 86 is in the lower position.

The system is subject to regulation. The air pressure obtained in the reservoir 32, between discharges, may be regulated to the loading of dust on the filter surfaces for best operation. Automatic control may be employed, which will be responsive to the differential in pressure between inlet and output, or any other indicator of the rate of dust accumulation on filter elements, so as to regulate the filter cleaning interval appropriately to the air being filtered.

The principal advantage of the present invention resides in the efficiency of the system, and in the simplicity of control. By utilizing the energy of the flow of the compressed gas to close a portion of the system, I have obviated the need of more costly controls and/or motors. Likewise, since the freeing of the accumulation on the filters reduces the pressure within the system, the control valve will open under the influence of gravity, and again obviate the need of controls and/or motors.

Another and highly important advantage is in the saving of energy for operating the system. The principal energy required is to operate the compressor which supplies gas under pressure to the reservoir, and this can be considerably less than the total energy for other types of systems.

My invention is defined in the terms of the appended claim.

I claim:

1. In apparatus for separating solids suspended in a gas from said gas, and having a normal flow path from an inlet chamber through filter means and associated clean gas chambers to a discharge chamber, together with a reservoir, means building up a supply of high energy gas in said reservoir, and timer actuated means interrupting the normal flow path through successive ones of said clean gas chambers and associated filter means and discharging high energy gas in a reverse direction therethrough to detach solids from said filter member, the improvement which comprises:

valve means including a chamber having a perforated peripheral wall and vertically extending guide means, a longitudinal axis with an outlet at one end and an inlet at the other end, and a valving member freely movable along said axis guided by said peripheral wall and said guide means;

means mounting said valve means in said clean gas chamber with said valving member resting against said inlet, said axis vertical, and said outlet in communication with said discharge chamber, so that said normal flow can take place from said clean gas chamber through said perforated wall and said outlet to said discharge chamber;

and means connected to said inlet to receive said high energy gas, so that said valve member is floated thereby to cut off said normal flow, and said high pressure gas is thereafter discharged into said clean gas chamber.

References Cited

UNITED STATES PATENTS

| | | | |
|---|---|---|---|
| 1,609,359 | 12/1926 | Humphrey | 137—109 X |
| 2,162,573 | 6/1939 | Clemmons | 139—109 X |
| 2,576,656 | 11/1951 | Wallin | 55—287 X |
| 3,027,908 | 4/1962 | Cochran | 137—109 |
| 3,057,478 | 10/1962 | Price | 210—411 X |
| 3,167,415 | 1/1965 | Edwards | 55—302 |
| 3,394,532 | 7/1968 | Oetiker | 55—302 |

FOREIGN PATENTS 21,225     1914    Great Britain.

DENNIS E. TALBERT, JR., Primary Examiner

U.S. Cl. X.R.

55—283, 288, 302, 341; 137—109; 210—333, 411